US008006225B1

(12) United States Patent  
Braun et al.

(10) Patent No.: US 8,006,225 B1
(45) Date of Patent: Aug. 23, 2011

(54) METHOD AND SYSTEM FOR AUTOMATIC GENERATION OF INSTRUCTION-SET DOCUMENTATION FROM AN ABSTRACT PROCESSOR MODEL DESCRIBED USING A HIERARCHICAL ARCHITECTURAL DESCRIPTION LANGUAGE

(75) Inventors: Gunnar Braun, Aachen (DE); Volker Greive, Aachen (DE); Andreas Hoffmann, Herzogenrath (DE)

(73) Assignee: Synposys, Inc., Mountain View, CA (US)

( * ) Notice: Subject to any disclaimer, the term of this patent is extended or adjusted under 35 U.S.C. 154(b) by 1193 days.

(21) Appl. No.: 11/145,240

(22) Filed: Jun. 3, 2005

Related U.S. Application Data (60) Provisional application No. 60/577,163, filed on Jun. 3, 2004.

(51) Int. Cl.
*G06F 9/44* (2006.01)
(52) U.S. Cl. ............... 717/106; 717/114; 717/123
(58) Field of Classification Search ............ None
See application file for complete search history.

(56) References Cited

U.S. PATENT DOCUMENTS

| | | | |
|---|---|---|---|
| 5,819,088 A | 10/1998 | Reinders | |
| 5,822,745 A | 10/1998 | Hekmatpour | |
| 5,870,768 A | 2/1999 | Hekmatpour | |
| 5,884,060 A | 3/1999 | Vegesna et al. | |
| 5,887,174 A | 3/1999 | Simons et al. | |
| 5,894,576 A | 4/1999 | Bharadwaj | |
| 5,918,035 A | 6/1999 | Van Praet et al. | |
| 6,055,370 A | 4/2000 | Brown et al. | |
| 6,247,174 B1 | 6/2001 | Santhanam et al. | |
| 6,305,014 B1 | 10/2001 | Roediger et al. | |
| 6,405,351 B1 | 6/2002 | Steiss et al. | |
| 6,526,570 B1 | 2/2003 | Click, Jr. et al. | |
| 6,675,380 B1 | 1/2004 | McKinsey et al. | |
| 6,681,383 B1* | 1/2004 | Pastor et al. | 717/126 |
| 6,769,115 B1 | 7/2004 | Oldman | |
| 7,007,271 B2 | 2/2006 | Kumar et al. | |
| 7,237,207 B2 | 6/2007 | Panditharadhya et al. | |
| 7,313,773 B1 | 12/2007 | Braun et al. | |
| 7,324,931 B1* | 1/2008 | Warlock | 703/13 |
| 7,373,638 B1* | 5/2008 | Schliebusch et al. | 717/136 |
| 7,559,050 B2* | 7/2009 | Burger | 717/106 |
| 7,707,507 B1 | 4/2010 | Rowe et al. | |
| 2003/0188299 A1 | 10/2003 | Broughton et al. | |
| 2005/0125786 A1 | 6/2005 | Dai et al. | |

(Continued)

OTHER PUBLICATIONS

Baev, Ivan D. and Meleis, Waleed M. and Abraham, Santosh G., Backtracking-Based Instruction Scheduling to Fill Branch Delay Slots, 2002, Springer Netherlands, International Journal of Parallel Programming, vol. 30, issue 6, pp. 397-418.

(Continued)

*Primary Examiner* — Chuck O Kendall (57) ABSTRACT

A method and system for the automatic generation of instruction-set manuals. Specifically, the method of the present invention includes accessing an abstract processor model of a processor, wherein said abstract processor model is represented using a hierarchical architecture description language (ADL). The abstract processor model includes a plurality of instructions arranged in a hierarchical structure. An internal representation of the abstract processor model is generated by flattening the abstract processor model. The flattening process generates a plurality of rules grouped by common convergent instructions. Each rule describes an instruction path through the hierarchical structure that converges at a corresponding convergent instruction. An instruction-set documentation is automatically generated from the plurality of rules, wherein the instruction-set documentation is arranged convergent instruction by convergent instruction.

23 Claims, 7 Drawing Sheets

U.S. PATENT DOCUMENTS

2005/0216899 A1  9/2005  Muthukumar et al.

OTHER PUBLICATIONS

Mark Smotherman, Efficient Dag Construction and Heuristic Calculation for Instruction Scheduling, 1991, ACM Proceedings of the 24th annual international symposium on Microarchitecture, pp. 93-102.

Sanjay M. Krishamurthy, A Brief Survey of Papers on Scheduling for Pipelined PRocessors, 1990, ACM SIGPLAN Notices, vol. 25, Issue 7, pp. 97-106.

Qin et al., "Architecture Description Languages for Retargetable Compilation", 2002, CiteSeerX, pp. 1-33.

Kitajima et al., "Design of application specific CISC using PEAS-III", 2002, IEEE, pp. 1-7.

Pasricha et al., "A Framework for GUI-driven Design Space Exploration of a MIPS4K-like Processor", Apr. 2003, University of California, Irvine, pp. 1-26.

X. Nie and L. Gazi: A New Network Processor Architecture for High-Speed Communications. In Proc. Of the SIPS, 1999.

Gonzalez, R.: XTENSA: A Configurable and Extensible Processor, IEEE Micro, 2000.

Kobayashi, S. et al: Design Space Exploration for DSP Applications Using the ASIP Development System PEAS-III, Dept. of Informatics and Mathematical Science, Graduate School of Engineering Science, Osaka University, 2002.

L. Nowak: Graph Based Retargetable Microcode Compilation in the MIMOLA Design System, Association for Computing Machinery (ACM), 1987.

S. Weber, K. Keutzer et al.: Multi-View Operation-Level Design-Supporting the Design of Irregular ASIPS. Technical Report UCG/ERL M03/12, UC Berkeley, Apr. 2003.

C. Liem, P. Paulin, M. Cornero, A. Jerraya: Industrial Experience Using Rule-Driven Retargetable Code Generation for Multimedia Applications, 8th Int. Symp. On System Synthesis (ISSS), 1995.

A.V. Aho, M. Ganapathi, S.W.K. Tjiang: Code Generation Using Tree Matching and Dynamic Programming, ACM Trans. On Programming Languages and Systems 11, No. 4, Oct. 1989.

S. Hanono, S. Devadas: Instruction Selection, Resource Allocation, and Scheduling in the AVIV Retargetable Code Generator, 35th Design Automation Conference (DAC), 1998.

W. Qin, S. Malik: Flexible and Formal Modeling of Microprocessors With Application to Retargetable Simulation, Design, Automation, and Test in Europe (DATE), Mar. 2003.

P. Viana, E. Barros, S. Rigo, R.J. Azevedo, G. Araujo: Exploring Memory Hierarchy With ARCHC, 15th Symposium on Computer Architecture and High Performance Computing (SBAC), 2003.

A. Hoffmann, T. Kogel et al.: A Novel Methodology for the Design of Application-Specific Instruction-Set Processors (ASIP) Using a Machine Description Language. IEEE Transactions on Computer-Aided Design, Nov. 2001.

M. Hartoog, J.A. Rowson et al.: Generation of Software Tools From Processor Descriptions for Hardware/Software Codesign,. In Proc. of the DAC, Jun. 1997.

M. Itoh, M. Imai et al.: PEAS-Ill: An ASIP Design Environment. In Proc. of the ICCD, Sep. 2000.

P. Mishra, N. Dutt, and A. Nicolau: Functional Abstraction Driven Design Space Exploration of Heterogeneous Programmable Architectures. In Proc. of the ISSS. Oct. 2001.

A. Nohl. G. Braun et al.: A Universal Technique for Fast and Flexible Instruction-Set Architecture Simulation. In Proc. of the DAC, Jun. 2002.

A. Nohl and V. Greive et al.: Instruction Encoding Synthesis for Architecture Exploration Using Hierarchical Processor Models. In Proc. of the DAC, Jun. 2003.

R. Leupers, P. Marwedel: Retargetable Generation of Code Selectors From HDL Processor Models, European Design & Test Conference (ED & TC), 1997.

J. Van Praet D. Lanneer, G. Goossens, W. Geurts, H. De Man: A Graph Based Processor Model for Retargetable Code Generation, European Design and Test Conference (ED & TC), 1996.

C.W. Fraser, D.R. Hanson, T.A. Proebsting: Engineering a Simple, Efficient Code Generator Generator, ACM Letters on Programming Languages and Systems, vol. 1, No. 3, Sep. 1992.

G. Araujo: Code Generation Algorithms for Digital Signal Processors, Ph. D. thesis, Princeton University, Department of Electrical Engineering, Jun. 1997.

Schliebusch, et al.: Architecture Implementation Using the Machine Description Language LISA. In Proc. of the ASPDAC, Jan. 2002.

* cited by examiner

3 ADD

DESCRIPTION

610 { ADD instruction ("+") implements the addition of two operands, which are either two registers or one register and one immediate value. Like all the instructions in Lisa Tek RISC model, It can take pre-condition fields to be executed conditionally based on the value of a register from a subset of general registers

SYNTAX

620
```
(1) if (r<index>(cond_reg))    r<index>(dest_reg) = r<index>(src1_reg) + <value>(src2_imm)
(2) if ( (r<index>(cond_reg))  r<index>(dest_reg) = r<index>(src1_reg) + <value>(src2_imm)
(3) if (r<index>(cond_reg))    r<index>(dest_reg) = r<index>(src1_reg) + r<index>(src2_reg)
(4) if ( (r<index>(cond_reg))  r<index>(dest_reg) = r<index>(src1_reg) + r<index>(src2_reg)
(5)             r<index>(dest_reg) = r<index>(src1_reg) + <value>(src2_imm)
(6)             r<index>(dest_reg) = r<index>(src1_reg) + r<value>(src2_reg)
```

CODING

630
```
(1) 0b10 cond_reg 0b1000 0b000 0b1 src_imm src1_reg dest_reg
(2) 0b11 cond_reg 0b1000 0b000 0b1 src_imm src1_reg dest_reg
(3) 0b10 cond_reg 0b1000 0b000 0b0 0b00000000 src2_reg src1_reg dest_reg
(4) 0b11 cond_reg 0b1000 0b000 0b0 0b00000000 src2_reg src1_reg dest_reg
(5) 0b00 0bxx 0b1000 0b000 0b1 src2_imm src1_reg dest_reg
(6) 0b00 0bxx 0b1000 0b000 0b0 0b00000000src2_reg src1_reg dest_reg Remarks:
- cond_reg: index=0bx(2)
- dest_reg: index=0bx(4)
- src1_reg: index=0bx(4)
- src2_imm: value=0bx(12)
- src2_reg: index=0bx(4)
```

OPERATION

640
```
(1)IF (_NE(cond_reg<0,32>,0)) {
_ADD(src1_reg<0,32>,_SXT(src2_imm<0,12>)<0,32>)->dest_reg<0,32>;
}

(2)IF (_EQ(cond_reg<0,32>,0)) {
_ADD(src1_reg<0,32>,_SXT(src2_imm<0,12>)<0,32>)->dest_reg<0,32>;
}

(3)IF (_NE(cond_reg<0,32>,0)) {
_ADD(src1_reg<0,32>,_src2_reg<0,32>)->dest_reg<0.32>;
}

(4)IF (_EQ(cond_reg<0,32>,0)) {
_ADD(src1_reg<0,32>,_src2_reg<0,32>)->dest_reg<0.32>;
}

(5)_ADD(src1_reg<0,32>,_SXT(src2_imm<0,12>)<0,32>)->dest_reg<0,32>;

(6)_ADD(src1_reg<0,32>,src2_reg<0,32>)->dest_reg<0,32>;
```

FIG. 6

FIG. 7

METHOD AND SYSTEM FOR AUTOMATIC GENERATION OF INSTRUCTION-SET DOCUMENTATION FROM AN ABSTRACT PROCESSOR MODEL DESCRIBED USING A HIERARCHICAL ARCHITECTURAL DESCRIPTION LANGUAGE

RELATED UNITED STATES PATENT APPLICATION

This application claims priority to the co-pending provisional patent application Ser. No. 60/577,163, entitled "Automatic Extraction of Compiler Rule Patterns from hierarchical Architecture Description Languages," with filing date Jun. 3, 2004, and assigned to the assignee of the present invention, which is herein incorporated by reference in its entirety.

BACKGROUND OF THE INVENTION

1. Field of the Invention

Embodiments of the present invention relate to the field of software tools for system level design. Specifically, embodiments of the present invention relate to automatically generating instruction-set documentation from an abstract processor model described using a hierarchical architectural description language.

2. Related Art

The design and test of modern electronic devices, such as embedded processors (EP) and systems-on-a-chip (SoC) is a complex process involving many stages. For example, many systems, such as mobile devices, networking products, and modems require new embedded processors (EP). These EPs can either be general purpose, such as microcontrollers and digital signal processors (DSP), or application specific, using application specific instruction-set processors (ASIP). Compared to general-purpose processors, ASIPs provide a tradeoff of computational performance and flexibility on the one hand and power consumption on the other. Therefore, ASIPs that are designed to execute specific tasks very efficiently can be found in a wide range of embedded systems.

ASIPs are replacing off-the-shelf processors because of the strong trend towards application-specific, single chip solutions in the embedded systems. Thus, the challenging task for SoC/ASIP design is to explore the architecture space efficiently and fast enough to find the best fit for a given application within a number of constraints, such as performance, power consumption, physical size, market window, etc.

However, designing systems with ASIPs is far more complex than assembling systems with standard processors. The conventional design of embedded processors and the software development tool-chain are done manually with very little automation. This long, labor-intensive process requires teams of highly skilled hardware and software engineers with specialized knowledge.

At one stage of the design process, documentation is generated that describes the processor. Professional processor developers or software programmers understand how critical and important the documentation is to the success of design projects. Good documentation saves a great amount of time for the developers, who are the most expensive resources. However, writing the documentation and its maintenance in large software projects usually take much time and many efforts in collaboration among different teams. Documentation is mostly started very late in the design process, since at this time nearly all the critical parts are in their final phase.

However, producing documentation at the late stages does not serve any purpose for processor design projects, especially for one of the most important documents in the process of designing a processor, the instruction-set manual. The designer's document is used during the design cycle of the processor with the main purpose of keeping the design team up-to-date. The current status of the processor design is reflected and it is important to keep the document up-to-date and quickly distributed.

In the conventional art, the documentation was created manually. However manual writing is lengthy, introduces errors and delays in the design process. Normally, processor cores are designed by a team of professionals. If one or more developers are working on documentation, which manually is a slow process, the whole design team makes slow progress, since any changes must be written down for later modifications to the documentation. This does not promote short time-to-market design projects.

Moreover, the instruction-set is dynamically generated. As such, the manual maintenance of the documentation is very difficult to achieve. In the early stage when the instruction-set is being designed, instructions are constantly being added, removed or modified, and test runs are performed to examine those effects. It is necessary and essential that a correct documentation of the present status of the instruction-set design is available to all the design teams. However, manual maintenance of the documentation slows down the design process, thereby inhibiting short time-to-market design projects.

As a result, it is highly desirable that the document generation parallel the design process in order to benefit the design team in a timely fashion.

SUMMARY OF THE INVENTION

A method and system for the automatic generation of instruction-set documentation from an abstract processor model described using a hierarchical architectural description language (ADL). Specifically, in accordance with one embodiment of the present invention, the method of the present invention includes accessing an abstract processor model of a processor, wherein said abstract processor model is represented using a hierarchical ADL. The abstract processor model includes a plurality of instructions arranged in a hierarchical structure. An internal representation of the abstract processor model is generated by flattening the abstract processor model. The flattening process generates a plurality of rules grouped by common convergent instructions. Each rule describes an instruction path through the hierarchical structure that converges at a corresponding convergent instruction. An instruction-set documentation is automatically generated from the plurality of rules, wherein the instruction-set documentation is arranged convergent instruction by convergent instruction.

A system for the automatic generation of instruction-set documentation is also described, in accordance with another embodiment of the present invention. The system includes an accessing module that accesses an abstract processor model of a processor, wherein said abstract processor model is described using a hierarchical ADL. The abstract processor model includes a plurality of instructions arranged in a hierarchical structure. The system also includes a flattening module for generating an internal representation of the abstract processor model. The internal representation is generated by flattening the abstract processor model to obtain a plurality of rules grouped by common convergent instructions. Each rule describes an instruction path through the hierarchical structure that converges at a corresponding convergent instruction. The system also includes a document generator for automatically generating an instruction-set documentation that is arranged convergent instruction by convergent instruction.

BRIEF DESCRIPTION OF THE DRAWINGS

FIG. 6 is a diagram of an exemplary page of instruction-set documentation that is automatically generated, in accordance with one embodiment of the present invention.

DETAILED DESCRIPTION OF THE INVENTION

Reference will now be made in detail to the preferred embodiments of the present invention, a method and system for automatic generation of instruction-set documentation from an abstract processor model described using a hierarchical architectural description language, examples of which are illustrated in the accompanying drawings.

Accordingly, various embodiments of the present invention disclose a method and system for the automatic generation of user guides that include instruction-set documentation (e.g., instruction-set manual). Embodiments of the present invention are capable of automatic documentation generation in embedded processor design, such as the instruction-set manual. As a result, embodiments of the present invention allow for parallel generation of instruction-set documentation during a rapid prototyping design process.

Notation and Nomenclature

Figure 1:
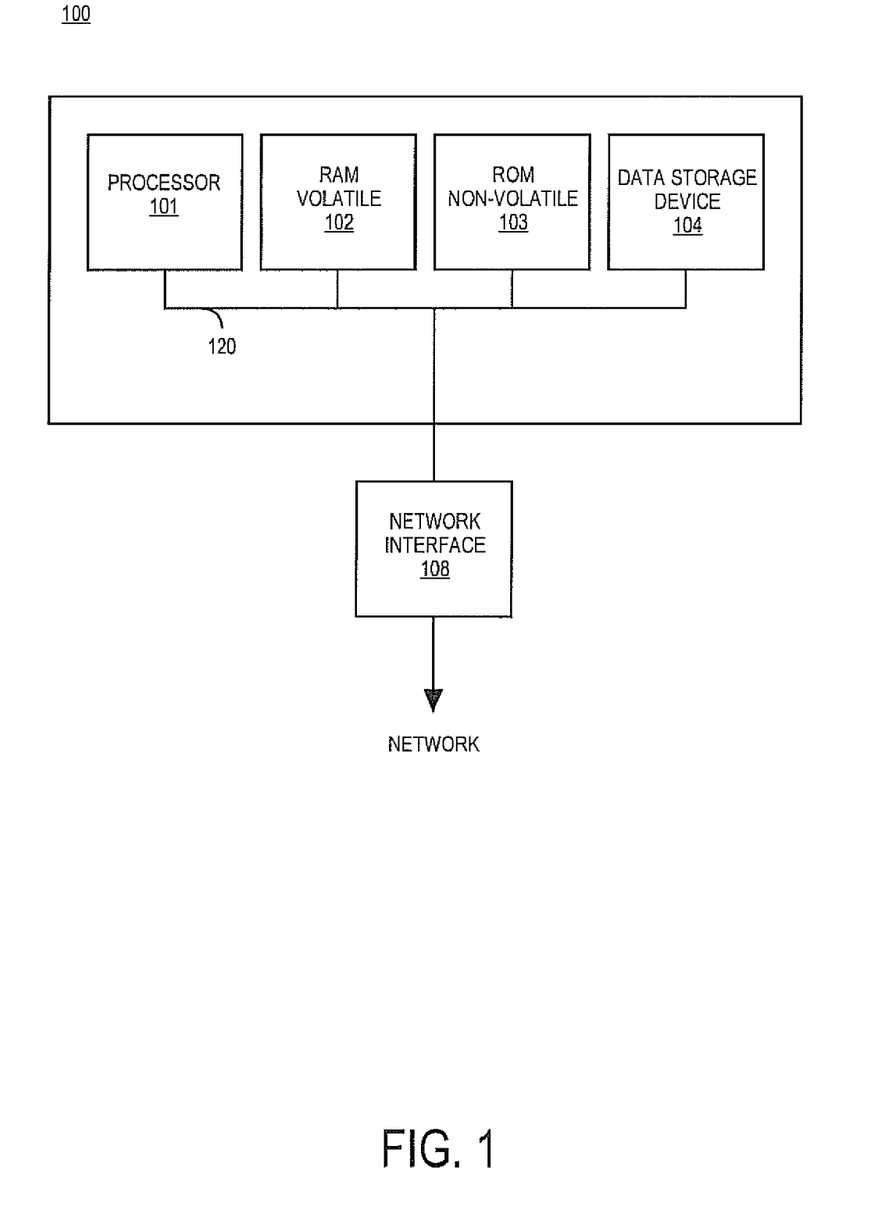
FIG. 1 is a block diagram of an electronic device that is capable of automatically generating instruction-set documentation from an abstract processor model described using a hierarchical architectural description language, in accordance with one embodiment of the present invention.

Referring now to FIG. 1, portions of the present invention are comprised of computer-readable and computer-executable instructions which reside, for example, in computer-readable media of an electronic system that are capable of accessing networked devices, such as, a server computer, mainframe, networked computer, workstation, hub, router, switch, firewall, access server, and the like. FIG. 1 is a block diagram of interior components of an exemplary electronic system 100, upon which embodiments of the present invention may be implemented.

Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., cache memory, memory card, hard drive, etc.) coupled with the bus 120 for storing information and instructions. Data storage device 104 is removable, in one embodiment. With reference still to FIG. 1, a network interface 108 (e.g., signal input/output device) is provided which is coupled to bus 120 for providing a communication link between electronic system 100 and a network environment. As such network interface 108 enables the central processor unit 101 to communicate with or monitor other electronic systems (e.g., networked devices) or coupled to a communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "generating," "determining," "categorizing," "converting," "translating," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 2:
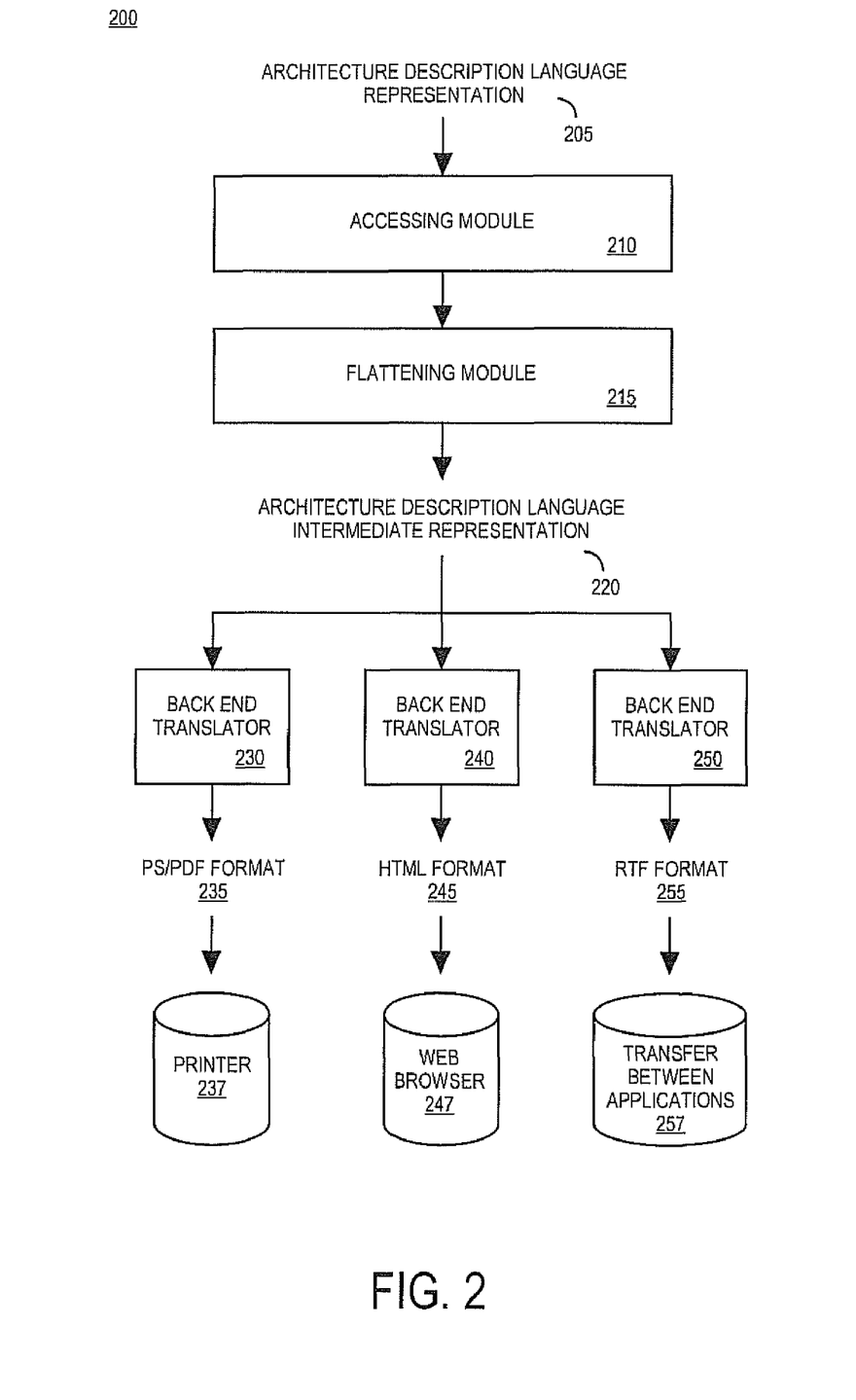
FIG. 2 is data flow diagram illustrating the flow of data through a system that is capable of automatically generating instruction-set documentation from an abstract processor model described using a hierarchical architectural description language, in accordance with one embodiment of the present invention.

Now referring to FIG. 2, a data flow diagram 200 illustrating the flow of information through a system that is capable of automatically generating instruction-set documentation from an abstract processor model described using a hierarchical ADL, in accordance with one embodiment of the present invention. The instruction-set documentation is essential for an overlapping hardware/software design process. That is, the software designer needs the instruction-set documentation before writing the software before the final register transfer-level (RTL) is completed. As such, in the present embodiment, the automatic generation of instruction-set documentation is performed in the design loop.

In one embodiment of the present invention, the automatic generation of a designer's document as the instruction-set documentation is described. The designer's document is used to share up-to-date design information during the design process. Also, in another embodiment of the present invention, the automatic generation of an end user's document as the instruction-set documentation is described. The end user's document is delivered with the processor chip as one of the final product documents.

Embodiments of the present invention are described within the context of architectural description languages (ADLs). The ADL supports the design flow for generation of processors, and have been established to close the gap between purely functional data-flow models and implementation modes in a hardware description language (e.g., HDL, etc.). For instance, the Language for Instruction-Set Architectures (LISA) has been designed for the description of instruction-set processor architectures. As a type of mixed structure/behavioral ADL, LISA consists of a structural part describing the processor resources, such as registers, memories, pipelines, etc. That is, mixed-level ADLs are treated as behavioral ADLs with the extension of the micro-architectural information. A behavioral part reflects the processor's instruction-set, including instruction encodings, assembly syntax, functional behavior and timing. LISA is capable of modeling the processor architecture on different abstraction levels with respect to the hardware structure as well as time. A LSIA processor description covers the information that is needed to generate a complete set of development tools, complier, assembler, linker, and simulator, for example.

As shown in FIG. 2, the document generator system includes an accessing module 210, a flattening module 215, and various back-end translators 230, 240 and 250. The data flow diagram 200 shows the flow of information through the document generator system to generate instruction-set documentation of varying formats, depending on the back-end translator that is used. In general, the document generator system as shown in FIG. 2, in a two step process, creates an internal representation of the abstract processor model described using the hierarchical ADL, and then automatically translates the internal representation to a back-end format (e.g., postscript, portable document format [pdf], latex, user defined format, etc.).

At the front-end, the abstract processor model, as an ADL representation, is accessed by the accessing module 210. That is, the accessing module is capable of retrieving, or receiving the abstract processor model as an input. The abstract processor model describes the processor using a hierarchical ADL.

The flattening module 215 converts the abstract processor model into an internal representation. More specifically, the flattening module 215 performs the necessary data-collecting process in order to form the intermediate representation 220. For example, the flattening process unravels the hierarchical structure of the abstract process model, such as by resolving open nodes in the hierarchical structure, etc.

The collection of data by the flattening module 215 includes the collection of the instruction name. The instruction name is presented in some text format, which can easily be found on each page of the instruction-set documentation that is generated for easy reference, in one embodiment.

The collection of data by the flattening module 215 also includes the collection of description information. The description provides the purpose of the instruction and describes what the instruction performs, and what operands are associated with the instruction.

The collection of data by the flattening module also includes the collection of syntax information. The syntax indicates for a programmer's model how an assembly programmer uses the associated instruction in the code.

The collection of data by the flattening module 215 also includes the collection of binary encoding information. That is, the coding describes the binary makeup of the processor instruction, and is provided for completeness.

Additionally, the collection of data by the flattening module 215 optionally includes the collection of semantical information. The semantical information includes a simple, clean and unique representation of the semantical meaning of the abstract processor models instructions, e.g., micro-operators that are defined by semantics. More specifically, the semantics of instructions are written in a C-like description, wherein a number of custom macros, or micro operations are defined to simplify the writing.

Also, the collection of data by the flattening module 215 includes the collection of description information. The description provides a short introduction of the instruction, and is provided as an extension of the hierarchical ADL, in one embodiment.

As shown in FIG. 2, each of the back-end translators transform the intermediate representation 220 of the abstract processor model into a back-end format. For instance, the back-end translator 230 transforms the intermediate representation 220 into a postscript or pdf format. The postscript or pdf format is compatible for use with printers, specifically. The back-end translator 240 transforms the intermediate representation 220 into a hypertext markup language (html) format that is suitable for use in web browsers. Further, the back-end translator 250 transforms the intermediate representation 220 into a rich text format (RTF) that is suitable for transfer between various applications.

Figure 3:
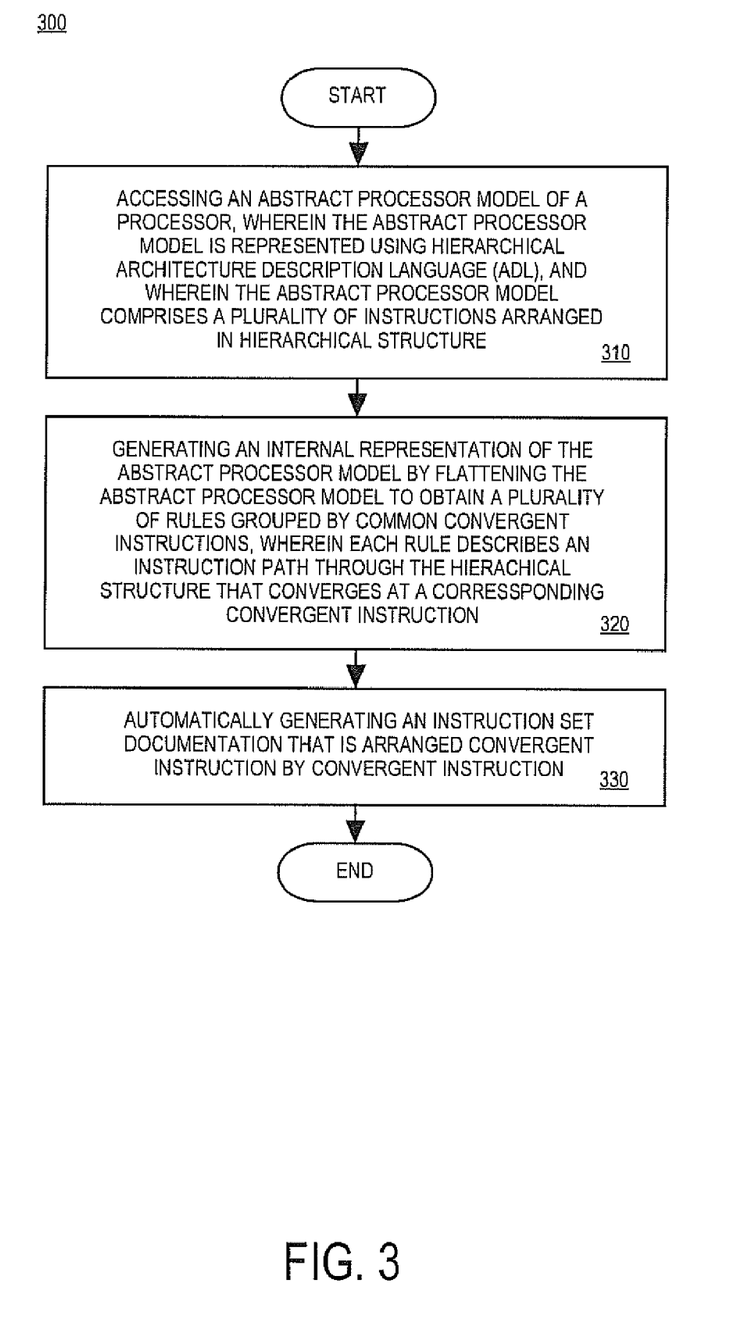
FIG. 3 is a flow chart illustrating steps in a computer implemented method for automatically generating instruction-set documentation from an abstract processor model described using a hierarchical architectural description language, in accordance with one embodiment of the present invention.

Referring now to FIG. 3, a flow chart 300 is described illustrating steps in a computer implemented method for automatically generating instruction-set documentation from an abstract processor model described using a hierarchical ADL, in accordance with one embodiment of the present invention. The instruction-set documentation includes instructions/operations semantics (e.g., the meaning/purpose of instructions) and a description of the instruction. Further information for the instruction-set documentation is derived from the description of the binary coding and assembly syntax. Embodiments of the present invention are capable of automatic generation of user guides, such as design documentation, end user documentation, instruction-set manuals, etc.

At 310, the present embodiment accesses an abstract processor model of a processor. The abstract processor model is described using a hierarchical ADL. The abstract processor model is a hierarchical representation of a plurality of instructions. For instance, in one embodiment, the abstract processor model is a hierarchal tree of operations or instructions.

For embodiments of the present invention, the abstract processor model, as the hierarchical description, is enriched with additional information. For instance, the information includes textual descriptions that describes each instruction. In addition, semantical information is also included. The additional information provides the meaning and purpose of each instruction, in addition to its syntactical and functional description. This information is processed by a document generator (e.g., using a software tool) to automatically generate instruction-set documentation.

At 320, the present embodiment generates an internal representation of the abstract processor model. The internal representation is obtained by flattening the abstract processor model. As a result of the flattening process, a list of all possible permutations or combinations of instruction combinations is determined. This is possible since one opcode can have multiple formats of operands, etc.

More specifically, during the flattening process, a plurality of rules is determined, wherein each rule describes an instruction path through the hierarchical structure. The plurality of rules is grouped by common, convergent instructions. That is, each rule describes an instruction path that converges at a corresponding convergent instruction.

After flattening the tree to one level, a classification is performed by the present embodiment in order to categorize all the rules into groups which have the same opcode. That is, permutations or different combinations can be categorized into separate groups according to their same convergent instruction, as will be further described in relation to FIG. 4, below.

At 330, the present embodiment automatically generates instruction-set documentation that is arranged by convergent instruction. That is, instruction-set documentation generated for each opcode that is convergent or common between all the instruction rule paths are combined onto one page, as previously described. More specifically, each of the plurality of rules that is flattened is converted into a back-end format compatible with the instruction-set documentation.

Figure 4:
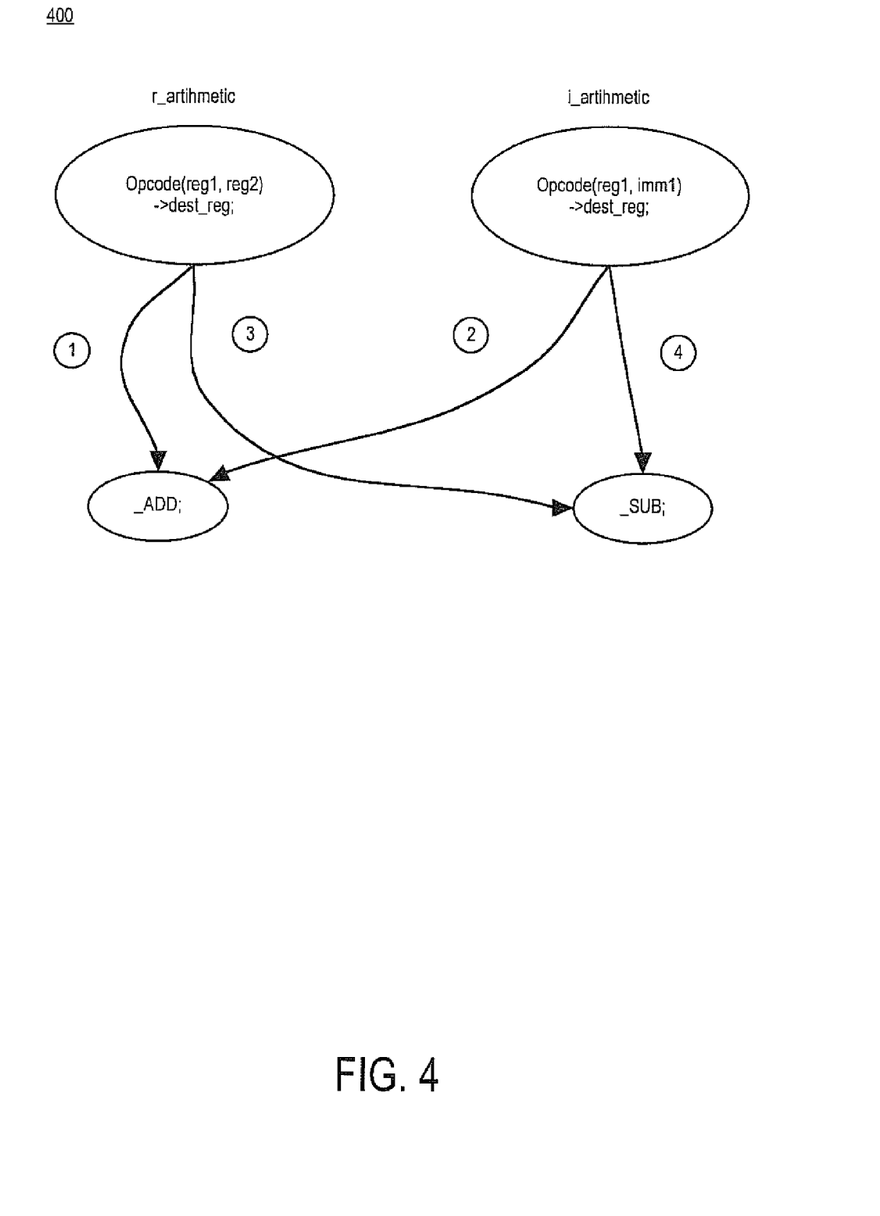
FIG. 4 is a diagram illustrating the flattening of an abstract processor model described using a hierarchical architectural description language, in accordance with one embodiment of the present invention.

FIG. 4 is a diagram of an exemplary example showing a part of an abstract processor model 400, in accordance with one embodiment of the present invention. FIG. 4 is shown to illustrate the categorization of rules, or paths of instructions, into groups according to the convergent instructions, or common opcodes. More specifically, FIG. 4 illustrates part of the operation tree, and shows that four different possibilities (traversing paths) are found. These paths are numbered 1, 2, 3, and 4 in FIG. 4.

The different combinations as shown in FIG. 4 are listed in Table 1. Table 1 is categorized by instruction-name. That is, in one embodiment, the instruction-set documentation is generated by instruction-name convention. For example, all the possibilities of the ADD instruction usages (paths 1 and 3) are combined into one page. Also, all the possibilities of the SUB instruction usages (paths 2 and 4) are combined into one page.

TABLE 1

Instruction Classifications

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
ADD instructions:
   1.   _ADD(reg1, reg2) –> dest_reg;
   3.   _ADD(reg1, imm1) –> dest_reg;
SUB instructions:
   2.   _SUB(reg1, reg2) –> dest_reg;
   4.   _SUB(reg1, imm1) –> dest_reg;
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

As shown in Table 1, the rules are categorized according to the ADD opcode and SUB opcode, as an example. As such, all the rules that pass through the ADD opcode are combined onto a single instruction page, and all the rules that pass through the SUB opcode are combined into a single instruction page. That is, two instruction pages can be generated according to the opcodes (e.g., convergent instructions) that are common and convergent within the rules.

In accordance with one embodiment of the present invention, the categorization of rules according to convergent instructions is performed by marking or identifying the opcode in the abstract processor mode that have the real opcodes in the tree-like data structure, so that the categorization can be performed. This marking is further described in relation to the documentation block of FIG. 5, below.

Figure 5:
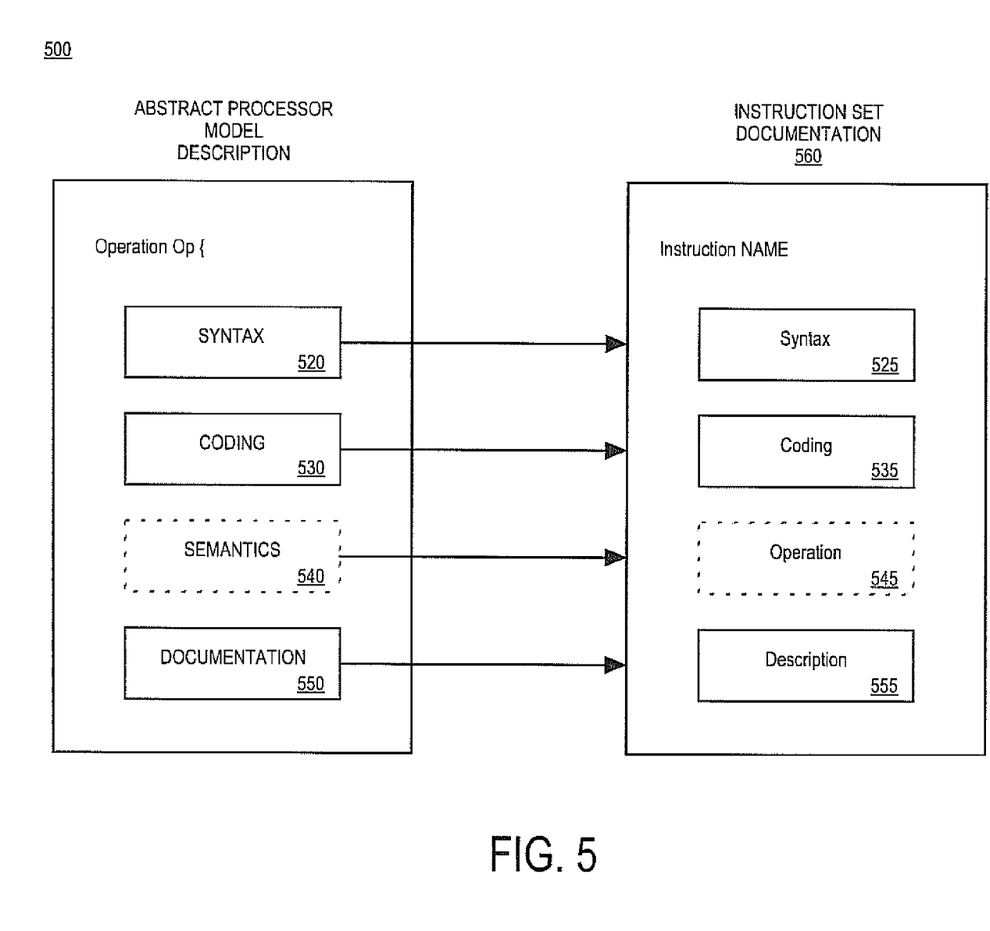
FIG. 5 is a diagram 500 illustrating the relationship of information between an abstract processor model description 510 and the instruction-set documentation 560 of a back-end format for a particular opcode, in accordance with one embodiment of the present invention.

FIG. 5 is a diagram 500 illustrating the relationship of information between an abstract processor model description 510 and the instruction-set documentation 560 of a back-end format for a particular opcode (e.g., Operation Op{ }), in accordance with one embodiment of the present invention.

The sections that can be directly used from FIG. 5 in the translation process is the information included within the SYNTAX block 520 the CODING block 530, and the SEMANTICS block 540. That is the information in these blocks can be directly accessed from the abstract processor model described using the hierarchical ADL and transformed into instruction-set documentation of the final format.

For example, information from the SYNTAX block 520 is generated through the ADL for use by development tools in the design process. Syntax information includes assembly information so that that programmer can program in assembly language for the processor. As a result, the document generator is able to directly transfer the syntax information from the SYNTAX block 520 as syntax information 525 in the instruction-set documentation 560.

FIG. 6 is a diagram of an exemplary page 600 of the instruction-set documentation that is automatically generated, in accordance with one embodiment of the present invention. The page 600 illustrates the ADD instruction, and provides a description section 610, a syntax section 620, a coding section 630, and an operations section 640. As shown in FIG. 6, the syntax section 620 provides assembly language instructions for the ADD instruction Correspondingly, information from the CODING block 530 is generated through the ADL for use by development tools in the design process. Coding information includes binary information for the instruction. As a result, the document generator is able to directly transfer the coding information from the CODING block 530 as coding information 535 in the instruction-set documentation 560. As shown in FIG. 6, the coding section 630 provides binary code for the ADD instruction.

Correspondingly, information from the optional SEMANTIC block 540 is provided by extension of the ADL. Semantical information provides simple, clean and unique representation of the semantical meaning of the abstract processor model's instructions. As a result, the document generator is able to transform the semantical information from block 540 to operation information 545 of the instruction-set documentation 560. As shown in FIG. 6, the operation section 640 provides the operations described by the SEMANTIC block 540. A complete discussion regarding the SEMANTIC block 540 is provided in the co-pending provisional application to this application Ser. No. 60/577,163, entitled "Automatic Extraction of Compiler Rule Patterns from hierarchical Architecture Description Languages," which is incorporated herein by reference.

In addition, information from the DOCUMENTATION block 550 is provided by extension of the ADL. Documentation information provides a description of the instruction. That is, the description provides a brief text describing the purpose of this opcode, which is applicable to all usages of the opcode. As a result, the document generator is able to obtain the description information of the DOCUMENTATION block 550 and provide description information 555 for the instruction-set documentation. As shown in FIG. 6, the description section 610 provides the description of the ADD instruction.

Table 2 illustrates sample pseudo-code including the DOCUMENTATION and SEMANTICS section, in accordance with one embodiment of the present invention. The DOCUMENTATION section is shown and is a character string that includes text. The text is a flat description of the ADD instruction of Table 2. The text is copied into the description section (e.g., section 610) of the instruction-set documentation, in one embodiment.

TABLE 2

DOCUMENTATION and SEMANTICS Pseudo Code

```
************************************************************
/ ** This operation implements the addition
*/
OPERATION add
{
  CODING {  0b1000  }
  SYNTAX {  "+"  }
  DOCUMENTATION {
    ADD instruction ("+") implements the addition of
    two operands, which are either two registers or
    one register and one immediate value. Like all
    the instructions in the abstract processor model,
    it can take pre-condition fields to be executed
    conditionally based on the value of a register
    from a subset of general registers.
  }
  SEMANTICS {  _ADD;  }
}
************************************************************
```

Figure 7:
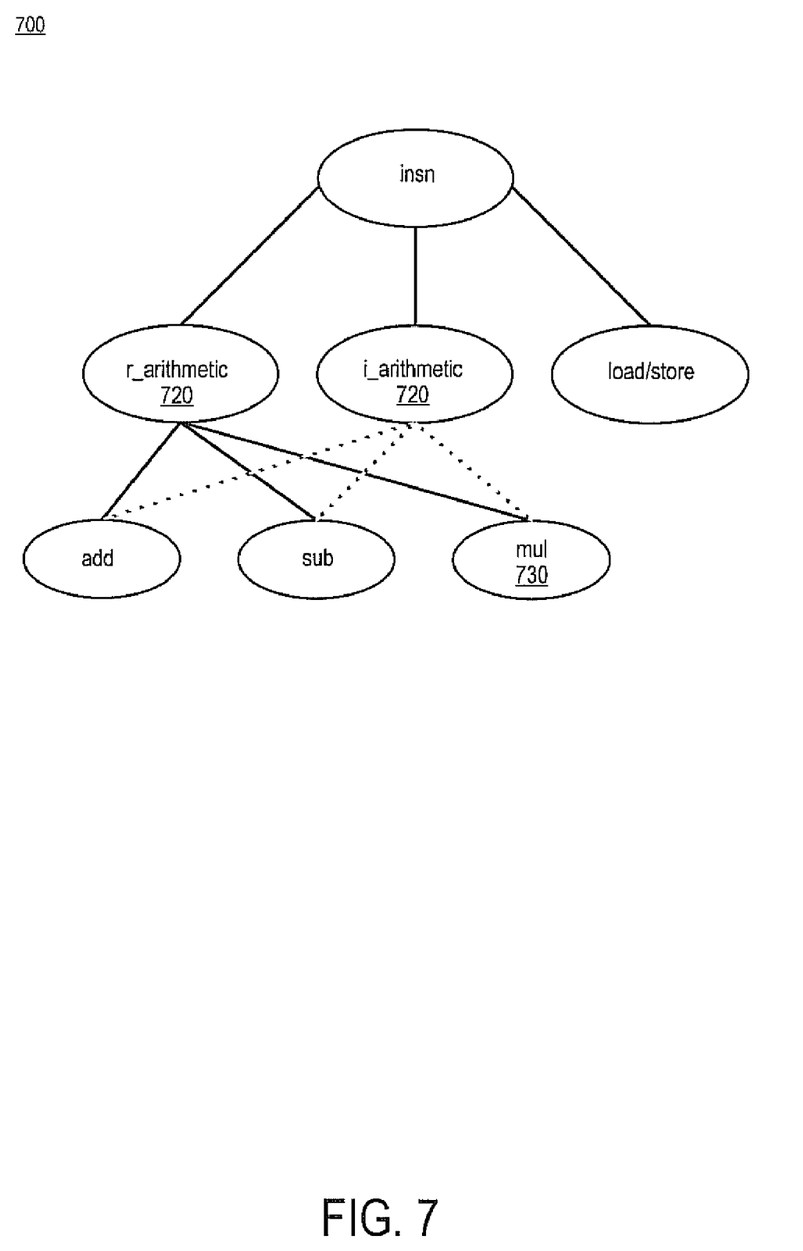
FIG. 7 is a diagram showing part of an operation tree illustrating the groupings of instruction names for the automatic generation of instruction-set documentation, in accordance with one embodiment of the present invention.

FIG. 7 is a diagram illustrating part of an operation tree 700 illustrating the groupings of instruction names for the automatic generation of instruction-set documentation, in accordance with one embodiment of the present invention. The present embodiment marks each convergent instruction in the hierarchical operation tree of the abstract processor model with a documentation section. The documentation section describes an instruction of a corresponding instruction node, as described previously with relation to FIG. 6.

A critical part of the DOCUMENTATION section (e.g., section 610 of FIG. 6 is the placement and location inside the abstract processor model in order to achieve the desired groupings. The present embodiment marks only the real opcode (the convergent instruction) OPERATION with DOCUMENTATION sections. As such, the DOCUMENTATION section is used as a marker to highlight the nodes of the convergent instructions, so that the paths, or instruction rules, which go through the same marker are grouped together (e.g., the same instruction opcode).

In FIG. 7, the markers are placed on Opcode operations so that all the paths that are traversed through this operation can be grouped. For example, different paths through r_arithmetic and i_arithmetic through the mul operation 730 are placed on the same page of the instruction-set documentation that is automatically generated. As such, the documentation generator is able to perform the classification, or groupings by convergent instructions, after flattening by identifying the marked instructions in order to generate the pages of the instruction-set documentation as organized by opcode.

In accordance with one embodiment of the present invention, after collecting all possible usages of an instruction (e.g., ADD), a numbering scheme is applied to all of them since each possibility has a different syntax, binary encoding, and semantics operations combination. As shown in FIG. 6, the ADD instruction has up to six usages depending on the pre-condition fields and operands. The number prefix indicates the respective Syntax, Coding, and Operation in terms of usage.

The numbering of the generated rules indicates which lines are mapped to a possible instruction format. That is, all lines with the same number are mapped to one possible instruction format. Correct numbering is ensured in the module where an individual possible path is emitted and the different section texts are given the same number, which is reflected in the abstract processor model as described using the hierarchical ADL. The back-end translators (e.g., 230, 240, and 250 of FIG. 2) can utilize the numbering information to output the instruction-set documentation in various formats.

Accordingly, various embodiments of the present invention disclose a method and system for the automatic generation of user guides that include instruction-set documentation. Embodiments of the present invention are capable of automatic documentation generation in embedded processor design, such as the instruction-set manual. As a result, embodiments of the present invention allow for parallel generation of instruction-set documentation during a rapid prototyping design process While the methods of embodiments illustrated in flow chart 300 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for automatically generating instruction-set documentation from an abstract processor model described using a hierarchical architectural description language are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method for automatic generation of instruction-set manuals, comprising:

accessing an abstract processor model of a processor, wherein said abstract processor model is described using a hierarchical architecture description language (ADL), wherein said abstract processor model comprises a plurality of instructions arranged in a hierarchical structure;

generating an internal representation of said abstract processor model by flattening said abstract processor model to obtain a plurality of rules grouped by common convergent instructions, wherein each rule describes an instruction path through said hierarchical structure that converges at a corresponding convergent instruction; and automatically generating an instruction-set documentation for said processor from said internal representation, wherein said instruction-set documentation is arranged convergent instruction by convergent instruction.

2. The method of claim 1, wherein said flattening said abstract processor model further comprises:

determining all permutations of instruction combinations in said abstract processor model; and categorizing said permutations into separate groups which have the same convergent instruction.

3. The method of claim 1, wherein said automatically generating an instruction-set further comprises:
converting each of said plurality of rules that is flattened and associated with a convergent instruction into a back-end format of said instruction-set documentation.

4. The method of claim 1, wherein said automatically generating an instruction-set documentation further comprises:
for a convergent instruction, accessing coding information as an extension of said abstract processor model, wherein said coding information comprises binary information of said convergent instruction; and
listing said coding description in said instruction-set documentation for said convergent instruction.

5. The method of claim 1, wherein said automatically generating an instruction-set documentation further comprises:
for a convergent instruction, accessing syntax information as an extension of said convergent instruction in said abstract processor model, wherein said syntax information comprises assembly information of said convergent instruction; and
listing said syntax information in said instruction-set documentation for said convergent instruction.

6. The method of claim 1, wherein said automatically generating an instruction-set documentation further comprises:
for a convergent instruction, accessing documentation information as an extension of said convergent instruction in said abstract processor model, wherein said documentation information comprises textual information describing said convergent instruction; and
listing said documentation information in said instruction-set documentation for said convergent instruction.

7. The method of claim 6, further comprising:
before said flattening, marking each convergent instruction in said hierarchical structure with a documentation section, wherein said documentation section describes an instruction of a corresponding instruction node.

8. The method of claim 1, wherein said automatically generating an instruction-set documentation further comprises:
for a convergent instruction, accessing semantical information as an extension of said convergent instruction in said abstract processor model; and
listing operations in said semantical information in said instruction-set documentation for said convergent instruction.

9. A system for automatic generation of instruction-set manuals, comprising:
an accessing module for accessing an abstract processor model of a processor, wherein said abstract processor model is described using a hierarchical architecture description language (ADL), wherein said abstract processor model comprises a plurality of instructions arranged in a hierarchical structure;
a flattening module for generating an internal representation of said instruction-set description by flattening said abstract processor model arranged to obtain a plurality of rules grouped by common convergent instructions, wherein each rule describes an instruction path through said hierarchical structure that converges at a corresponding convergent instruction; and
a document generator for automatically generating an instruction-set documentation for said processor from said internal representation, wherein said instruction-set documentation is arranged convergent instruction by convergent instruction.

10. The system of claim 9, wherein said abstract processor model represents an instruction-set description of said processor.

11. The system of claim 9, wherein said abstract processor model comprises a hierarchical operation tree.

12. The system of claim 9, wherein said document generator further comprises:
a translator for translating a convergent instruction in said internal representation to a back-end format of said instruction-set documentation.

13. The system of claim 12, wherein said back-end format is taken from a group consisting essentially of:
hypertext markup language (html);
postscript;
portable document format (pdf); and
latex.

14. The system of claim 9, wherein each convergent instruction described in said instruction-set documentation further comprises:
coding information comprising binary information of said convergent instruction;
syntax information comprising assembly information for said convergent instruction; and
documentation information comprising textual information describing said convergent instruction.

15. The system of claim 9, wherein each convergent instruction described in said instruction-set documentation further comprises:
semantical information comprising micro-operations of said convergent instruction.

16. A computer system comprising:
a processor; and
a computer readable memory coupled to said processor and containing program instructions that, when executed, implement a method for automatic generation of instruction-set manuals, comprising:
accessing an abstract processor model of a processor, wherein said abstract processor model is described using a hierarchical architecture description language (ADL), wherein said abstract processor model comprises a plurality of instructions arranged in a hierarchical structure;
generating an internal representation of said abstract processor model by flattening said abstract processor model to obtain a plurality of rules grouped by common convergent instructions, wherein each rule describes an instruction path through said hierarchical structure that converges at a corresponding convergent instruction; and
automatically generating instruction-set documentation for said processor from said internal representation, wherein said instruction-set documentation is arranged convergent instruction by convergent instruction.

17. The computer system of claim 16, wherein said flattening said abstract processor model further comprises:
determining all permutations of instruction combinations in said abstract processor model; and
categorizing said permutations into separate groups which have the same convergent instruction.

18. The computer system of claim 16, wherein said automatically generating instruction-set further comprises:
converting each of said plurality of rules that is flattened and associated with a convergent instruction into a back-end format of said instruction-set documentation.

19. The computer system of claim 16, wherein said automatically generating instruction-set documentation further comprises:

for a convergent instruction, accessing coding information as an extension of said abstract processor model, wherein said coding information comprises binary information of said convergent instruction; and listing said coding description in said instruction-set documentation for said convergent instruction.

20. The computer system of claim 16, wherein said automatically generating instruction-set documentation further comprises:

for a convergent instruction, accessing syntax information as an extension of said convergent instruction in said abstract processor model, wherein said syntax information comprises assembly information of said convergent instruction; and listing said syntax information in said instruction-set documentation for said convergent instruction.

21. The computer system of claim 16, wherein said automatically generating instruction-set documentation further comprises:

for a convergent instruction, accessing documentation information as an extension of said convergent instruction in said abstract processor model, wherein said documentation information comprises textual information describing said convergent instruction; and listing said documentation information in said instruction-set documentation for said convergent instruction.

22. The computer system of claim 21, further comprising:

before said flattening, marking each convergent instruction in said hierarchical structure with a documentation section, wherein said documentation section describes an instruction of a corresponding instruction node.

23. The computer system of claim 16, wherein said automatically generating instruction-set documentation further comprises:

for a convergent instruction, accessing semantical information as an extension of said convergent instruction in said abstract processor model; and listing operations in said semantical information in said instruction-set documentation for said convergent instruction.

* * * * *